(12) United States Patent
Zhao et al.

(10) Patent No.: US 11,370,382 B2
(45) Date of Patent: Jun. 28, 2022

(54) AIRBAG ASSEMBLY

(71) Applicant: Ford Global Technologies, LLC, Dearborn, MI (US)

(72) Inventors: Haiyan Zhao, Novi, MI (US); Ming Shen, Troy, MI (US); Robert William McCoy, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/949,645

(22) Filed: Nov. 9, 2020

(65) Prior Publication Data

US 2022/0144205 A1  May 12, 2022

(51) Int. Cl.
*B60R 21/231* (2011.01)
*B60R 21/015* (2006.01)
*B60R 21/20* (2011.01)
*A61G 3/08* (2006.01)

(52) U.S. Cl.
CPC .. *B60R 21/23138* (2013.01); *B60R 21/01512* (2014.10); *B60R 21/20* (2013.01); *A61G 3/0808* (2013.01)

(58) Field of Classification Search
None
See application file for complete search history.

(56) References Cited

U.S. PATENT DOCUMENTS

| | | | | |
|---|---|---|---|---|
| 3,858,930 A | * | 1/1975 | Calandra | B60N 2/4221 296/68.1 |
| 5,730,458 A | * | 3/1998 | Byon | B60R 19/00 280/730.2 |
| 5,967,549 A | * | 10/1999 | Allen | B60R 21/01554 280/730.1 |
| 6,435,591 B1 | * | 8/2002 | Nilsson | B60N 2/4228 296/68.1 |
| 10,427,634 B2 | | 10/2019 | Gandhi et al. | |
| 10,583,797 B2 | * | 3/2020 | Line | B60N 2/42763 |
| 10,821,930 B2 | * | 11/2020 | Malapati | B60R 21/0136 |
| 2005/0127645 A1 | * | 6/2005 | Smith | B60N 2/42736 280/730.2 |
| 2020/0093662 A1 | * | 3/2020 | Mori | B60N 2/3011 |
| 2020/0094766 A1 | | 3/2020 | Malapati et al. | |

FOREIGN PATENT DOCUMENTS

| | | |
|---|---|---|
| JP | 2018127057 A | 8/2018 |
| JP | 2018187950 A | 11/2018 |
| KR | 102005746 B1 | 7/2019 |

* cited by examiner

*Primary Examiner* — Faye M Fleming
(74) *Attorney, Agent, or Firm* — Frank A. MacKenzie; Bejin Bieneman PLC (57) ABSTRACT

An assembly includes a vehicle floor defining a seating area. The assembly includes a post supported by the vehicle floor and movable along a vehicle-longitudinal axis adjacent the seating area. The assembly includes an airbag supported by the post above the vehicle floor.

20 Claims, 6 Drawing Sheets

AIRBAG ASSEMBLY

BACKGROUND

A vehicle may include one or more airbags deployable during a vehicle impact to control kinematics of occupants inside the vehicle during the impact. The airbag may be a component of an airbag assembly including a housing supporting the airbag, and an inflation device in communication with the airbag for inflating the airbag from an uninflated position to an inflated position.

One or more of the airbags may be side airbags that are inflatable along a side of an occupant, specifically along the torso and/or hip of the occupant. The side airbag, for example, may be inflatable between the occupant and a vehicle door. The side airbags control the kinematics of the occupant in vehicle for impacts that urge the occupant in a cross-vehicle direction, e.g., a side impact.

DETAILED DESCRIPTION

An assembly includes a vehicle floor defining a seating area. The assembly includes a post supported by the vehicle floor and movable along a vehicle-longitudinal axis adjacent the seating area. The assembly includes an airbag supported by the post above the vehicle floor.

The post may be variable in length.

The post may include a first telescoping member and a second telescoping member.

The assembly may include an actuator designed to change a length of the post.

The airbag may be rotatable about a vertical axis.

The assembly may include an actuator designed to rotate the airbag about the vertical axis.

The actuator may include a motor.

The assembly may include a position sensor supported by the post.

The position sensor and the airbag may be at a distal end of the post.

The position sensor may be rotatable about a vertical axis.

The vehicle floor may include a track elongated along the vehicle-longitudinal axis.

The assembly may include an actuator designed to move the post along the vehicle-longitudinal axis.

The actuator may include a worm gear.

The actuator may include a sled fixed to the post and operatively coupled to the worm gear.

The assembly may include a vehicle seat supported by the vehicle floor within the seating area.

The assembly may include a personal mobility device attachment assembly supported by the vehicle floor within the seating area.

The post may be vehicle-outboard of the seating area.

With reference to FIGS. 1-5, wherein like numerals indicate like parts throughout the several views, an assembly 100 for controlling kinematics of an occupant of a vehicle 102 includes a vehicle floor 104 defining a seating area 106. The assembly 100 includes a post 108 supported by the vehicle floor 104 and movable along a longitudinal axis A1 adjacent the seating area 106. The assembly 100 includes an airbag 110 supported by the post 108 above the vehicle floor 104. Moving the post 108 along the longitudinal axis A1 enable the airbag 110 supported by the post 108 to be positioned relative to the seating area 106. For example, the post 108 and airbag 110 may be moved forward or rearward along the longitudinal axis A1 to accommodate a position and/or orientation of an occupant seated in a seat 112 or a personal mobility device 114 supported in the seating area 106.

In the present application, relative vehicular orientations and directions (by way of example, top, bottom, front, rear, outboard, inboard, inward, outward, lateral, left, right, etc.) is from the perspective of an occupant seated in the vehicle 102 facing forward, e.g., toward a forward instrument panel and/or forward windshield of the vehicle 102. The forward direction of the vehicle is the direction of movement of the vehicle 102 when the vehicle 102 is engaged in forward drive with wheels of the vehicle straight. Orientations and directions relative to the assembly 100 are given related to when the assembly 100 is supported by the vehicle 102 as described below and shown in the Figures.

The vehicle 102 may be any suitable type of automobile, e.g., a passenger or commercial automobile such as a sedan, a coupe, a truck, a sport utility, a crossover, a van, a minivan, a taxi, a bus, etc. The vehicle 102, for example, may be autonomous. In other words, the vehicle 102 may be autonomously operated such that the vehicle 102 may be driven without constant attention from a driver, i.e., the vehicle 102 may be self-driving without human input.

The vehicle 102 defines the longitudinal axis A1 extending between a front and a rear of the vehicle 102. The vehicle 102 defines a lateral axis A2 extending between a right side and a left side of the vehicle 102. The vehicle 102 defines a vertical axis A3 extending between a top and a bottom of the vehicle 102. The longitudinal axis A1, the lateral axis A2, and the vertical axis A3 are perpendicular relative to each other.

The vehicle 102 includes a vehicle body 116. The vehicle body 116 includes body panels partially defining an exterior of the vehicle 102. The body panels may present a class-A surface, e.g., a finished surface exposed to view by a customer and free of unaesthetic blemishes and defects. The body 116 may include, e.g., a roof, one or more pillars 118, etc.

The vehicle body 116 defines a passenger compartment 122 to house occupants, if any, of the vehicle 102. The passenger compartment 122 may extend across the vehicle 102, i.e., from the right side to the left side of the vehicle 102. The passenger compartment 122 includes a front end and a rear end with the front end being in front of the rear end during forward movement of the vehicle 102.

The floor 104 of the vehicle 102 supports objects, such as seats 112, occupants, the personal mobility device 114, etc., within the passenger compartment 122. The floor 104 may extend from the front end to the rear end of the passenger compartment 122 and from the right side to the left side of the vehicle 102. The floor 104 defines the seating area 106. The seating area 106 designates positions in the passenger compartment 122 for the occupant to occupancy. For example, the seating area 106 may be defined by anchors 124 of the floor 104. The anchors 124 may include fasters, reinforcement plates, etc. The anchors 124 may be connected to the seat 112 and/or a personal mobility device attachment assembly 126 supported by the floor 104 within the seating area 106. The seating area 106 may surround the anchors 124.

The floor 104 can include a track 128. The track 128 enables movement of the post 108 along the longitudinal axis A1. For example, the post 108 may be supported by and slide along the track 128. The track 128 is elongated along the longitudinal axis A1. The track 128 permits movement of the post 108 along the elongation of the track 128. The track 128 may restrict movement of the post 108 transverse to the elongation of the track 128. In such an example, the post 108 is moveable only in a straight line along the axis A1. The track 128 may include a C-channel, and/or any other suitable structure(s). For example, the track 128 may include a C-channel elongated along the longitudinal axis A1.

Figure 1:
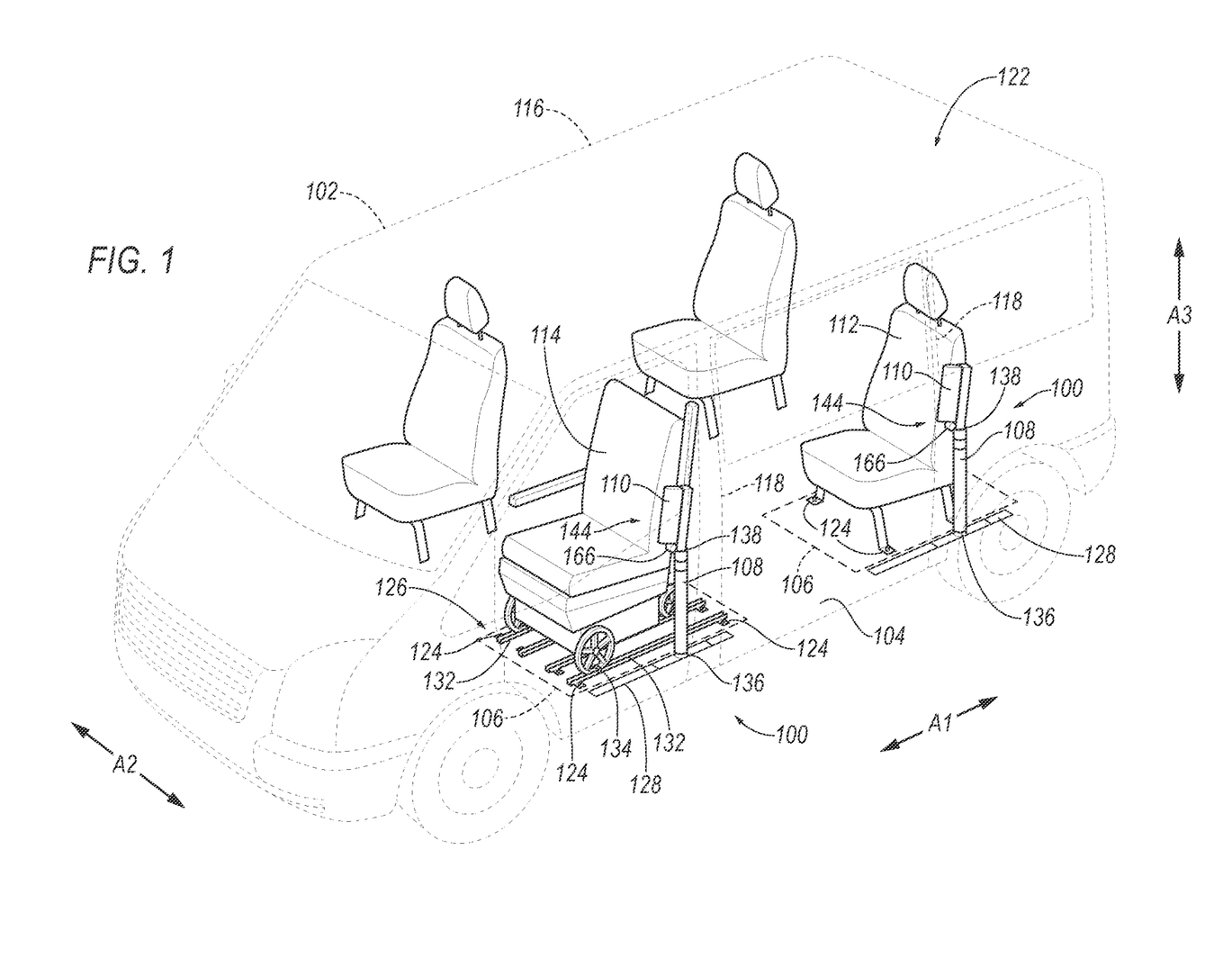
FIG. 1 is a perspective view a vehicle having an assembly that includes a movable post supporting an airbag.

The seat 112, shown in FIG. 1, includes a seatback and a seat bottom (not numbered). The seatback may be supported by the seat bottom and may be stationary or movable relative to the seat bottom. The seatback and the seat bottom may be adjustable in multiple degrees of freedom. Specifically, the seatback and the seat bottom may themselves be adjustable, in other words, adjustable components within the seatback and/or the seat bottom, and/or may be adjustable relative to each other. The seatback may include a seatback frame and a covering supported on the seatback frame. The seatback frame may include tubes, beams, etc. Specifically, the seatback frame includes a pair of upright frame members. The upright frame members are elongated, and specifically, are elongated in a generally upright direction when the seatback is in a generally upright position. The upright frame members are spaced from each other and the seatback frame includes cross-members (not shown) extending between the upright frame members. The seatback frame, including the upright frame members, may be of any suitable plastic material, e.g., carbon fiber reinforced plastic (CFRP), glass fiber-reinforced semi-finished thermoplastic composite (organosheet), etc. As another example, some or all components of the seatback frame may be formed of a suitable metal, e.g., steel, aluminum, etc. The covering may include upholstery and padding. The upholstery may be cloth, leather, faux leather, or any other suitable material. The upholstery may be stitched in panels around the frame. The padding may be between the covering and the seatback frame and may be foam or any other suitable material. The seat 112 may be supported in the seating area 106, e.g., fixed to the floor 104 via the anchors 124. The seat 112 may be removable and/or foldable, e.g., to provide space for the personal mobility device 114. The seat 112 may rotate, e.g., to face the front or the rear of the vehicle.

Figure 2:
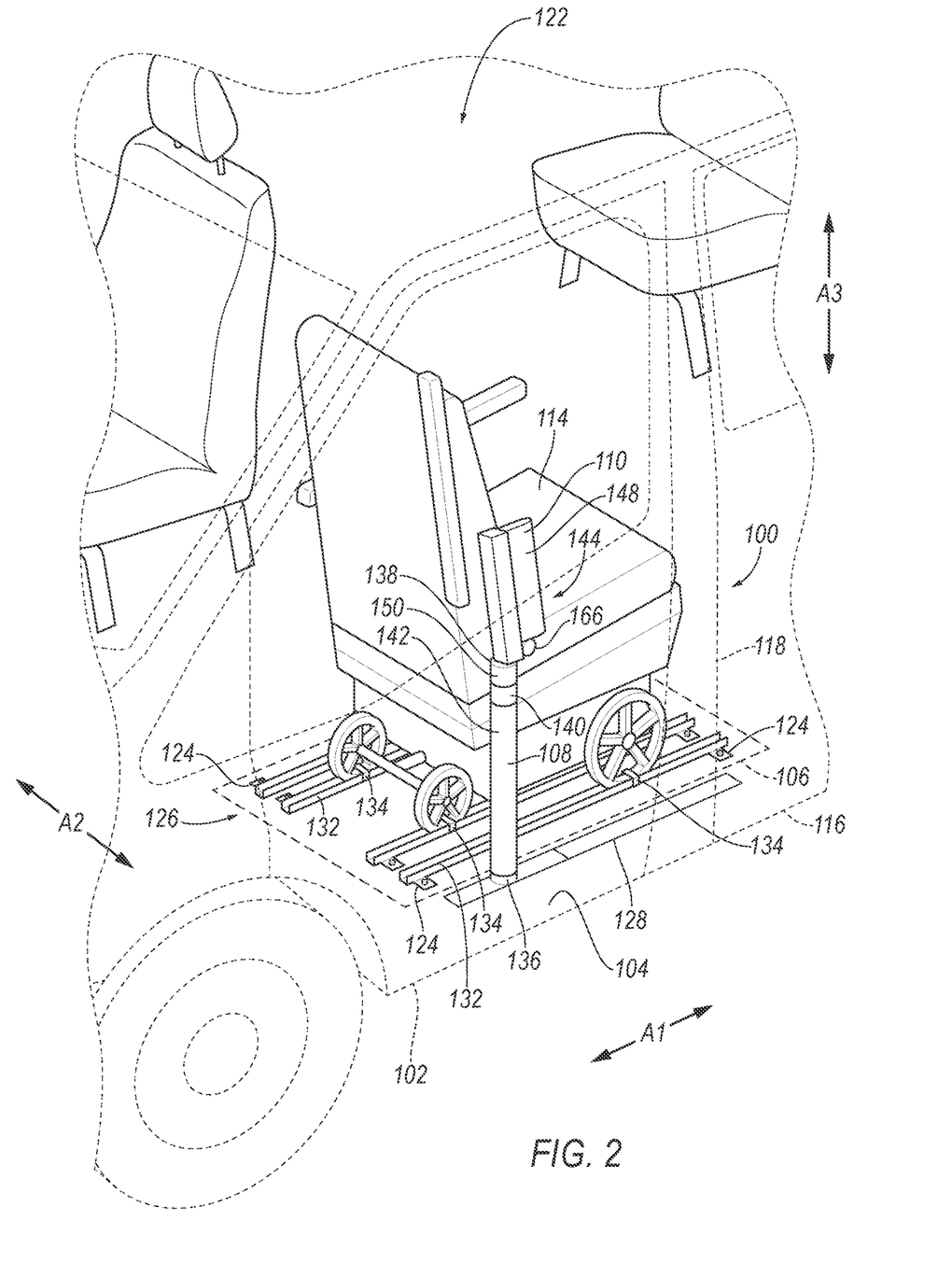
FIG. 2 is a perspective view of a portion of the vehicle having the assembly that includes the movable post supporting the airbag.

The personal mobility device attachment assembly 126, shown in FIGS. 1 and 2, secures the personal mobility device 114 within the passenger compartment 122. The personal mobility device attachment assembly 126 may include channels 132 designed to engage wheels of the personal mobility device 114. Specifically, the channels 132 are sized and shaped to receive wheels of the personal mobility device 114 such to resist lateral movement of the personal mobility device 114 during operation of the vehicle 102. The channels 132 may be spaced from each other along the lateral axis A2 and parallel to each other along the longitudinal axis A1. The channel may be fixed to the floor 104 via the anchors 124. The personal mobility device attachment assembly 126 may include suitable number of latches 134, tethers, etc., to secure the wheels or other structure of the personal mobility device 114 to the vehicle 102 and limit relative movement therebetween. The latches 134 may limit the movement of the personal mobility device 114 in the channels 132, e.g., via engagement with the wheels. The latches 134 may be electronic or manual, e.g., each latch may include a solenoid. Actuation of the solenoid may engage the latch with the wheel.

The personal mobility device 114 may be of any suitable type that supports a seated occupant and provides mobility to the seated occupant, i.e., the personal mobility device 114 transports the seated occupant outside of the vehicle 102 and moves the seated occupant in the passenger compartment 122 during ingress to and egress from the vehicle 102. The personal mobility device 114 supports the seated occupant in the passenger compartment 122 during operation of the vehicle 102. The personal mobility device 114 may include wheels, as described above. As examples including wheels, the personal mobility device 114 may be a wheelchair or a scooter. As another example, the personal mobility device 114 may include a continuous track. In such an example, the continuous track is in contact with ground and personal mobility device 114 may include wheels that transmit force to the continuous track. The personal mobility device 114 may include a motor operably connected to the wheels and a battery that provides power to the motor. The personal mobility device 114 may be for example, a wheelchair, an electric mobility scooter, etc.

The post 108 is supported by the vehicle floor 104 and movable along the longitudinal axis A1 adjacent the seating area 106, e.g., vehicle-outboard of the seating area 106. The post 108 may be supported by the track 128. For example, the post 108 may include rollers, a slider block, or other suitable structure engaged with the track 128 and permitting movement of the post 108 along the track 128. The post 108 is movable along the longitudinal axis A1 and may be prevented from moving along the lateral axis A2. For example, the post 108 may be moved longitudinally along the track 128

The post 108 defines a length, e.g., between a proximate end 136 at the floor 104 and a distal end 138 spaced from the floor 104. The post 108 may be variable in length. Varying the length of the post 108 moves the distal end 138 relative to the proximate end 136 along the vertical axis A3. Varying the length of the post 108 controls a position of the airbag 110 along the vertical axis A3. The post 108 can include a first telescoping member 140 and a second telescoping member 142. The first telescoping member 140 may be moveable relative to the second telescoping member 142, e.g., between an extended position, where the post 108 is relatively longer, and a collapsed position, where the post 108 is relatively shorter. For example, the second telescoping member 142 may define a passage, and the first telescoping member 140 may be slidably supported in the passage. In other words, the first telescoping member 140 may slide within the passage relative to the second telescoping member 142 between the extended position and the collapsed position. The post 108 may include other structure to vary length between the proximate end 136 and the distal end 138.

An airbag assembly 144 is supported by the post 108 above the floor 104, e.g., at the distal end 138 of the post 108. The airbag assembly 144 includes the airbag 110 and an inflator 146 (shown in FIG. 6). The airbag assembly 144 may include an airbag housing 148. The inflator 146 inflates the airbag 110 to an inflated position, shown in FIG. 5 and further described further below.

The airbag 110 may be woven nylon yarn, for example, nylon 6, 6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

In an example in which the airbag assembly 144 includes the airbag housing 148, the airbag 110 is supported by the airbag housing 148. The airbag housing 148 houses the airbag 110 in an uninflated position and supports the airbag 110 in an inflated position. The airbag 110 may be rolled and/or folded to fit within the airbag housing 148 in the uninflated position. The airbag housing 148 may be of any suitable material, e.g., a rigid polymer, a metal, a composite, or a combination of rigid materials.

The inflator 146 is in fluid communication with the airbag 110. The inflator 146 expands the airbag 110 with inflation medium, such as a gas, to move the airbag 110 from the uninflated position to the inflated position. The inflator 146 may be supported by any suitable component. For example, the inflator 146 may be supported by the housing 148. The inflator 146 may be, for example, a pyrotechnic inflator that ignites a chemical reaction to generate the inflation medium, a stored gas inflator that releases (e.g., by a pyrotechnic valve) stored gas as the inflation medium, or a hybrid. The inflator 146 may be, for example, at least partially in the inflation chamber to deliver inflation medium directly to the inflation chamber or may be connected to the inflation chamber through fill tubes, diffusers, etc.

The airbag 110 may be rotatable about the vertical axis A3. For example, a swivel 150 (shown in FIG. 4), or other suitable structure for providing relative rotation between two components, may connect the airbag housing 148 at the distal end 138 of the post 108. The airbag housing 148 may rotate about the vertical axis A3 and relative to the post 108 via movement of the swivel 150.

Figure 3:
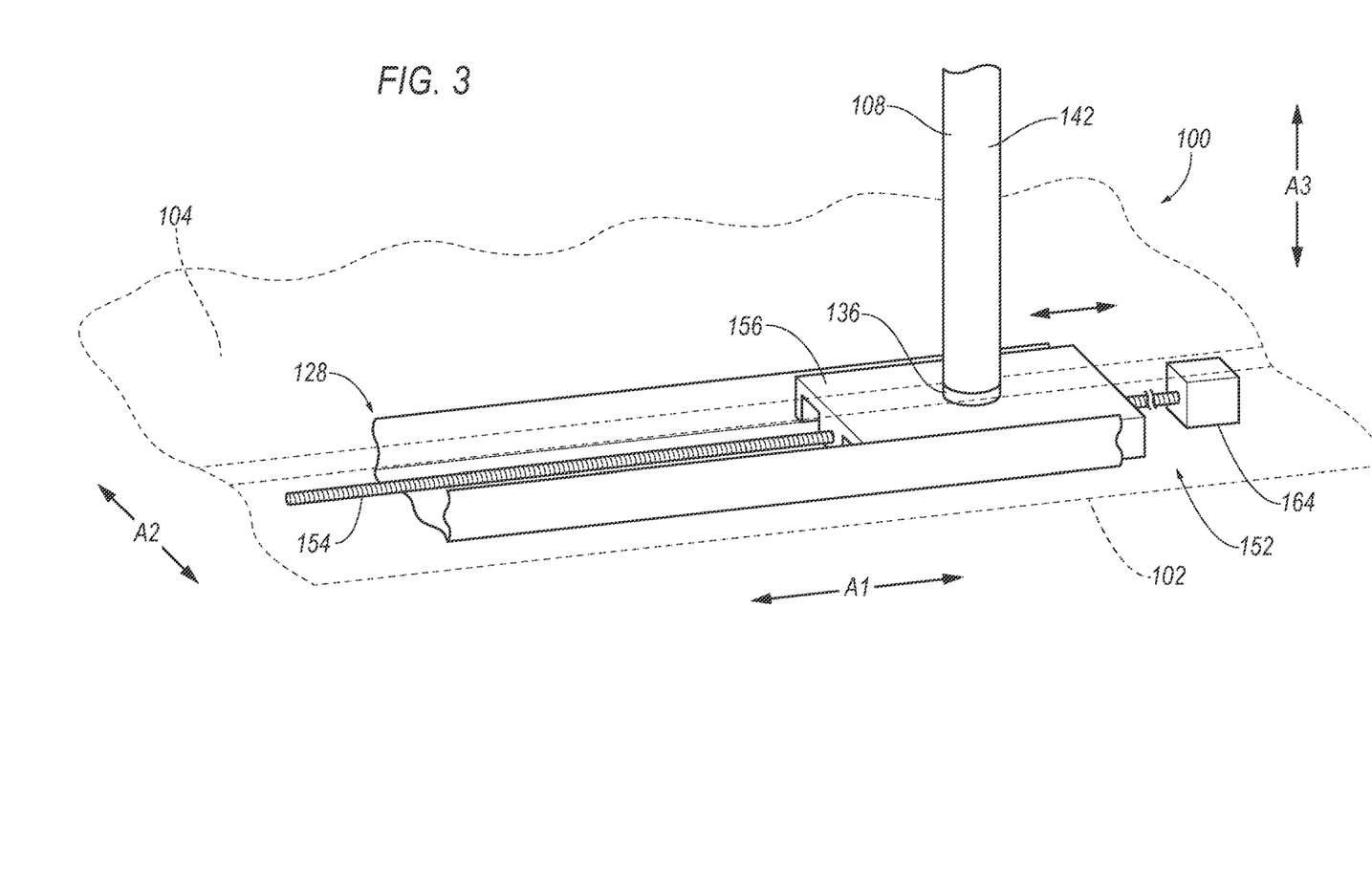
FIG. 3 is a perspective view of a portion of the vehicle having the assembly that includes the movable post supporting the airbag.
Figure 6:
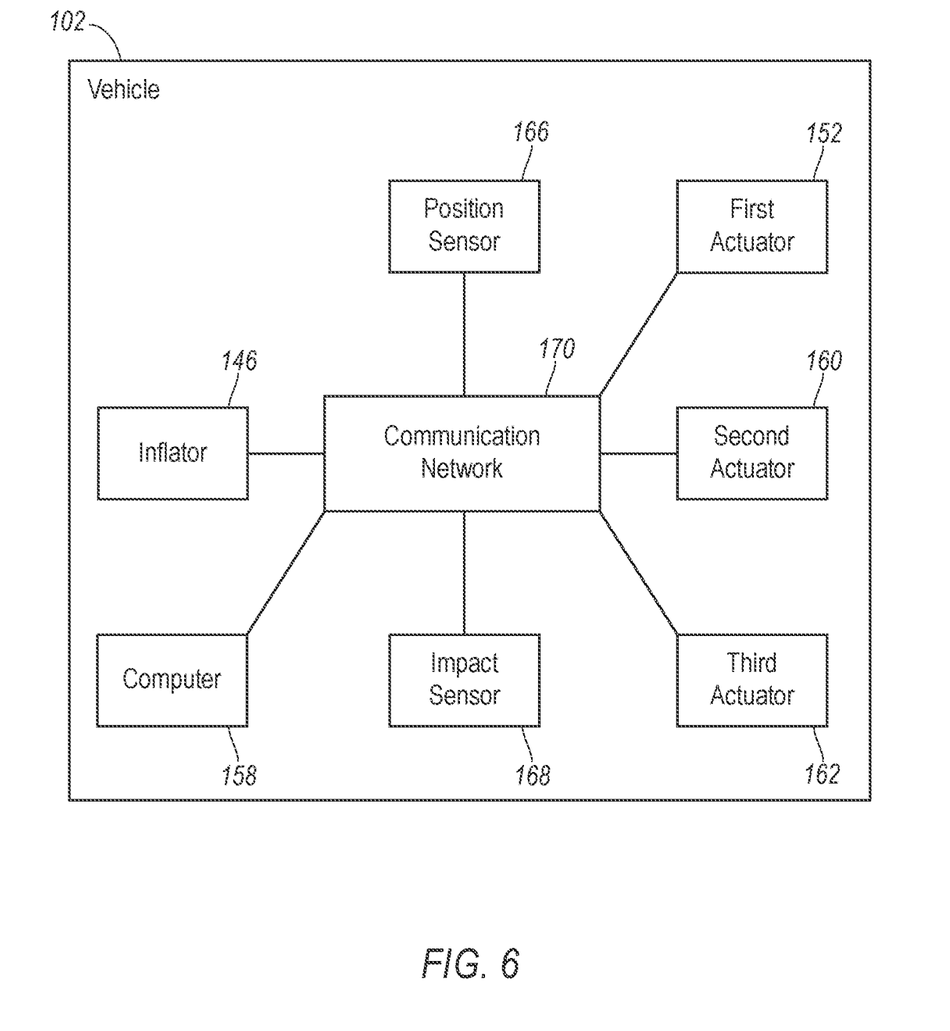
FIG. 6 is a block diagram of components of the vehicle.

With reference to FIGS. 3 and 6, the assembly 100 may include a first actuator 152 designed to move the post 108 along the longitudinal axis A1. The first actuator 152 may move the post 108 along the elongation of the track 128 along the longitudinal axis A1. The first actuator 152 can include a worm gear 154 and a sled 156 operatively coupled to the worm gear 154, i.e., such that the sled 156 moves along an axis of the worm gear 154 when the worm gear 154 is rotated relative to the sled 156. The sled 156 may be fixed to the post 108, e.g., via fastener, weld, etc. The first actuator 152 may include a motor 164 operatively coupled to transmit torque to the worm gear 154. The first actuator 152 may include other electromechanically and/or hydraulic structure suitable from moving the post 108 along the track 128, e.g., a rack and pinion, etc. The first actuator 152 may actuate to move the post 108 along the longitudinal axis A1 in response to a command from a computer 158. In examples in which the post 108 is movable along the longitudinal axis A1 and prevented from moving along the lateral axis A2, the first actuator 152, and specifically at least the worm gear 154, may be fixed along the lateral axis A2. In such an example, rotation of the worm gear 154 moves the sled 156 along only the longitudinal axis A1.

Figure 4:
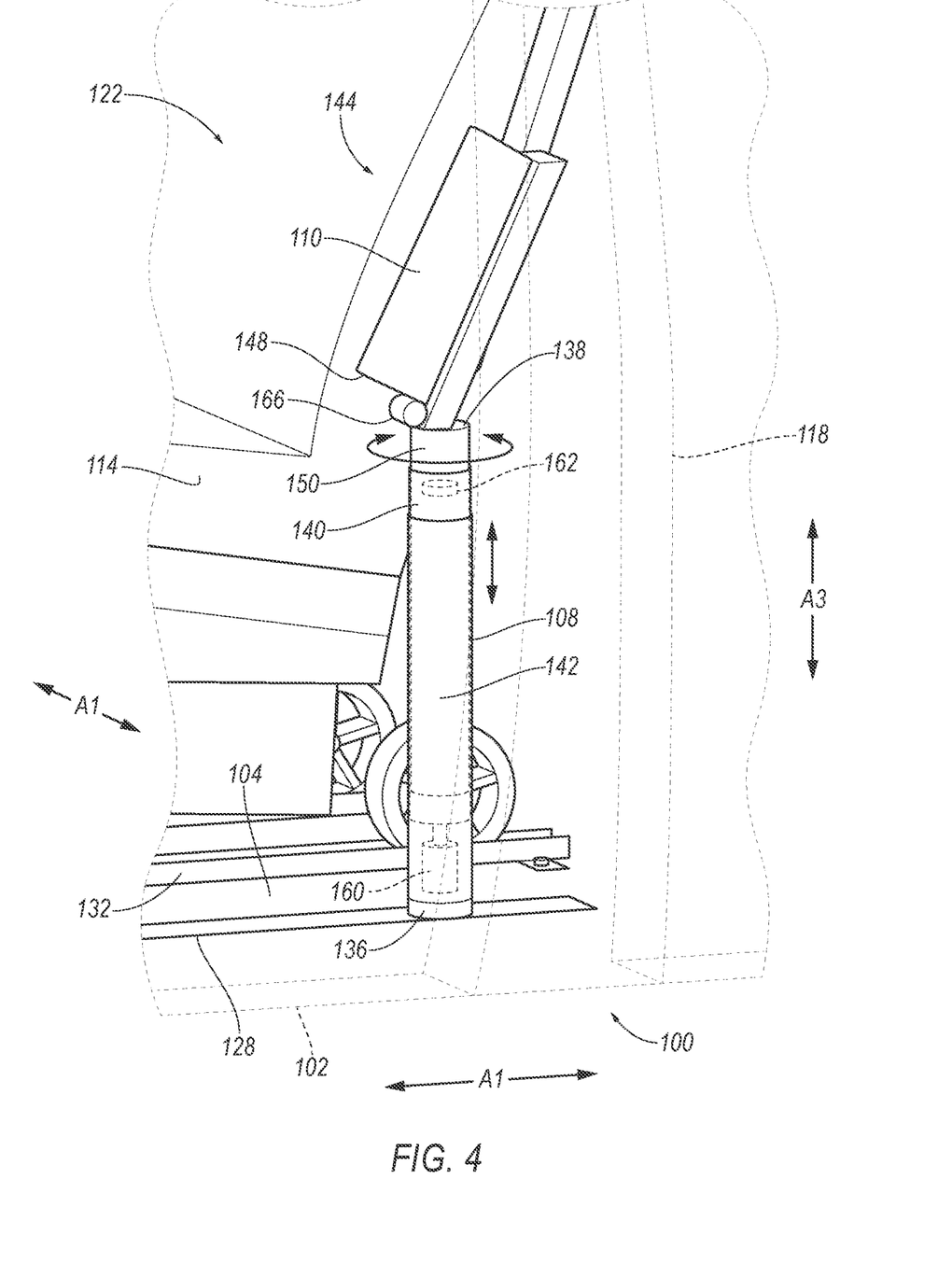
FIG. 4 is a perspective view of a portion of the vehicle having the assembly that includes the movable post supporting the airbag.
Figure 5:
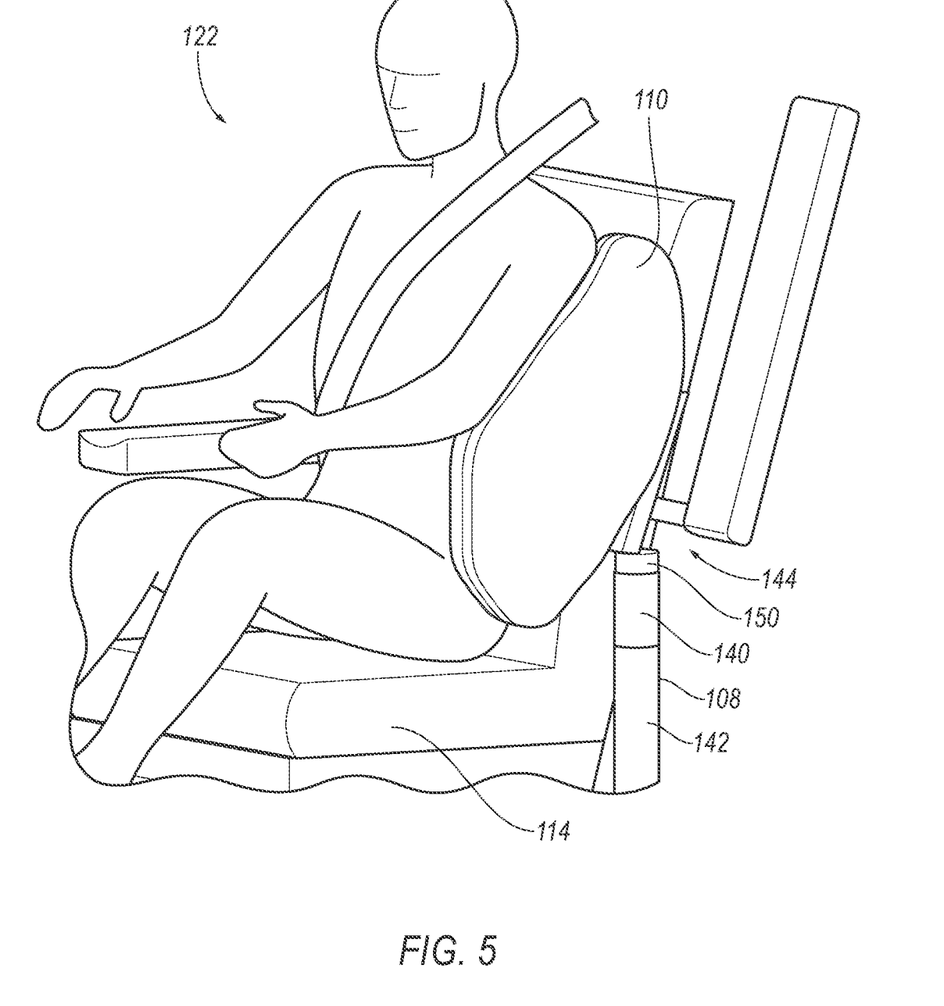
FIG. 5 is a perspective view of a portion of the vehicle having the assembly that includes the movable post supporting the airbag in an inflated position.

With reference to FIGS. 4 and 6, the assembly 100 may include a second actuator 160 designed to change the length of the post 108, e.g., to move the post 108 from the extended position to the collapsed position and vice versa. The second actuator 160 may control a position of the first telescoping member 140 relative to the second telescoping member 142. The second actuator 160 may be a linear actuator, e.g., a screw type including a threaded shaft and hole, a hydraulic type including a piston and cylinder, a rack and pinion, etc. The second actuator 160 may actuate to change the length of the post 108 in response to a command from the computer 158.

The assembly 100 may include a third actuator 162 designed to rotate the airbag 110 about the vertical axis A3. The third actuator 162 may be operatively coupled to the airbag 110, i.e., such that torque generated by the third actuator 162 rotates the airbag 110. The third actuator 162 may be operatively couple to the swivel 150, the airbag housing 148, or other suitable structure. The third actuator 162 can include a motor, reduction gears, pulleys, belts, etc. The third actuator 162 may include a servo. The third actuator 162 may actuate to rotate the airbag 110 about the vertical axis A3 in response to a command from the computer 158.

The assembly 100 may include a position sensor 166. The position sensor 166 may detect a position of the seat 112, the personal mobility device 114, or other structure. The position sensor 166 may be supported by the post 108, e.g., at the distal end 138. The position sensor 166 may be rotatable about the vertical axis A3. The position sensor 166 may be fixed relative to the airbag 110, e.g., such that the airbag 110 and the position sensor 166 move along the track 128 and rotate about the vertical axis A3 generally in unison. The position sensor 166 may detect and generate data specifying the position of the seat 112, the personal mobility device 114, or other structure relative to the post 108 and/or the airbag 110. The position sensor 166 may include, a proximity sensor, a camera, etc.

With reference to FIG. 6, The vehicle 102 may include at least one impact sensor 168 for sensing impact of the vehicle 102, and the computer 158 in communication with the impact sensor 168 and the inflator 146. The computer 158 may activate the inflator 146, e.g., provide an impulse to a pyrotechnic charge of the inflator 146 when the impact sensor 168 senses an impact of the vehicle 102. Alternatively or additionally to sensing impact, the impact sensor 168 may be configured to sense impact prior to impact, i.e., pre-impact sensing. The impact sensor 168 may be in communication with the computer 158. The impact sensor 168 is configured to detect an impact to the vehicle 102. The impact sensor 168 may be of any suitable type, for example, post-contact sensors such as accelerometers, pressure sensors, and contact switches; and pre-impact sensors such as radar, LIDAR, and vision-sensing systems. The vision-sensing systems may include one or more cameras, CCD image sensors, CMOS image sensors, etc. The impact sensor 168 may be located at numerous points in or on the vehicle.

The computer 158 includes a processor and a memory such as are known. The memory includes one or more forms of computer 158 readable media, and stores instructions executable by the vehicle computer 158 for performing various operations, including as disclosed herein. The computer 158 may include programming to operate one or more of vehicle 102 brakes, propulsion (e.g., control of acceleration in the vehicle 102 by controlling one or more of an internal combustion engine, electric motor, hybrid engine, etc.), steering, climate control, interior and/or exterior lights, etc., as well as to determine whether and when the computer 158, as opposed to a human operator, is to control such operations. Additionally, the computer 158 may be programmed to determine whether and when a human operator is to control such operations.

The computer 158 may include or be communicatively coupled to, e.g., via a vehicle network such as a communications bus as described further below, more than one processor, e.g., included in components such as sensors, electronic controller units (ECUs) or the like included in the vehicle 102 for monitoring and/or controlling various vehicle components, e.g., a powertrain controller, a brake controller, a steering controller, etc. The computer 158 is generally arranged for communications on a vehicle communication network 170 that can include a bus in the vehicle 102 such as a controller area network (CAN) or the like, and/or other wired and/or wireless mechanisms. Via the communication network 170, the computer 158 may transmit messages to various devices in the vehicle 102 and/or receive messages (e.g., CAN messages) from the various devices, e.g., the inflator 146, the first actuator 152, the second actuator 160, the third actuator 162, the position sensor 166, the impact sensor 168, etc. Alternatively or additionally, in cases where the computer 158 actually comprises a plurality of devices, the vehicle communication network 170 may be used for communications between devices represented as the computer 158 in this disclosure. Further, as mentioned below, various controllers and/or sensors may provide data to the computer 158 via the communication network 170.

The computer 158 may be programmed to position the airbag 110. For example, the computer 158 may command the first actuator 152, the second actuator 160, and/or the third actuator 162 based on information received from the position sensor 166.

The computer 158 may be programmed to inflate the airbag 110. For example, the computer 158 may actuate the inflator 146 in response to receiving data from the impact sensor 168 indicating an impact to the vehicle 102.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. An assembly, comprising:
a vehicle floor defining a seating area;
a post supported by the vehicle floor and translatable along a vehicle-longitudinal axis adjacent the seating area; and
an airbag supported by the post above the vehicle floor.

2. The assembly of claim 1, wherein the post is variable in length.

3. The assembly of claim 1, wherein the post includes a first telescoping member and a second telescoping member.

4. The assembly of claim 1, wherein the assembly includes an actuator designed to change a length of the post.

5. The assembly of claim 1, wherein the airbag is rotatable about a vertical axis.

6. The assembly of claim 5, wherein the assembly includes an actuator designed to rotate the airbag about the vertical axis.

7. The assembly of claim 6, wherein the actuator includes a motor.

8. The assembly of claim 1, further comprising a position sensor supported by the post.

9. The assembly of claim 8, wherein the position sensor and the airbag are at a distal end of the post.

10. The assembly of claim 8, wherein the position sensor is rotatable about a vertical axis.

11. The assembly of claim 1, wherein the vehicle floor includes a track elongated along the vehicle-longitudinal axis, the post movable along the track.

12. The assembly of claim 1, further comprising an actuator designed to move the post along the vehicle-longitudinal axis.

13. The assembly of claim 12, wherein the actuator includes a worm gear.

14. The assembly of claim 13, wherein the actuator includes a sled fixed to the post and operatively coupled to the worm gear.

15. The assembly of claim 1, further comprising a vehicle seat supported by the vehicle floor within the seating area.

16. The assembly of claim 1, further comprising a personal mobility device attachment assembly supported by the vehicle floor within the seating area.

17. The assembly of claim 1, wherein the post is vehicle-outboard of the seating area.

18. The assembly of claim 1, wherein the post is elongated along a vertical axis.

19. The assembly of claim 1, wherein the post is translatable along the vehicle floor.

20. An assembly, comprising:
a vehicle floor defining a seating area;
a personal mobility device attachment assembly supported by the vehicle floor within the seating area;
a post supported by the vehicle floor and movable along a vehicle-longitudinal axis adjacent the seating area; and
an airbag supported by the post above the vehicle floor.

* * * * *